United States Patent [19]

Knutsen et al.

[11] 4,068,388
[45] Jan. 17, 1978

[54] PROCESS FOR REMOVING SOLVENT FROM PROTEINACEOUS MATERIAL

[75] Inventors: Tryggve Lund Knutsen, Asa Station; Sven-Olof Österman, Molndal, both of Sweden

[73] Assignee: Astra Protein Products AB, Sweden

[21] Appl. No.: 643,302

[22] Filed: Dec. 22, 1975

Related U.S. Application Data

[63] Continuation-in-part of Ser. No. 502,902, Sept. 3, 1974, abandoned.

[30] Foreign Application Priority Data

Sept. 14, 1973 Sweden .................. 7312533

[51] Int. Cl.² ........................... F26B 3/00
[52] U.S. Cl. ........................... 34/36; 426/459
[58] Field of Search ............. 203/49; 34/32, 36, 37, 34/9; 426/312, 474, 478, 489, 656, 657, 459; 159/47

[56] References Cited

U.S. PATENT DOCUMENTS

| | | | |
|---|---|---|---|
| 2,163,628 | 6/1939 | Pilkey | 426/478 |
| 2,585,793 | 2/1952 | Kruse | 426/431 |
| 2,618,560 | 11/1952 | Leslie | 426/112 |
| 2,691,830 | 10/1954 | Karnofsky | 34/37 |
| 2,776,894 | 1/1957 | Kruse | 426/478 |
| 2,987,399 | 6/1961 | Goering | 426/44 |
| 3,126,285 | 3/1964 | Lippold | 426/459 |
| 3,159,493 | 12/1964 | Japikse et al. | 426/463 |
| 3,392,455 | 7/1968 | Kingsbaker, Jr. et al. | 34/36 |
| 3,578,567 | 5/1971 | Malvin et al. | 203/49 |
| 3,682,648 | 8/1972 | Mitchell et al. | 426/428 |
| 3,700,461 | 10/1972 | Dickens, Jr. | 426/285 |

OTHER PUBLICATIONS

Condensed Chemical Dictionary; 8th Ed.-Van Nostrand Reinhold Co., New York (1971), p. 266.

*Primary Examiner*—Norman Yudkoff
*Attorney, Agent, or Firm*—Brumbaugh, Graves, Donohue & Raymond

[57] ABSTRACT

Solvent is evaporated from proteinaceous material by treating the protein material with humidified air at controlled rate, the humidified air having a temperature of 40° C to 90° C and a relative humidity of at least 50% such that enough energy is added for vaporization of the solvent at the same time as water is condensed from the humidified air and replaces the amount of solvent being vaporized.

13 Claims, 1 Drawing Figure

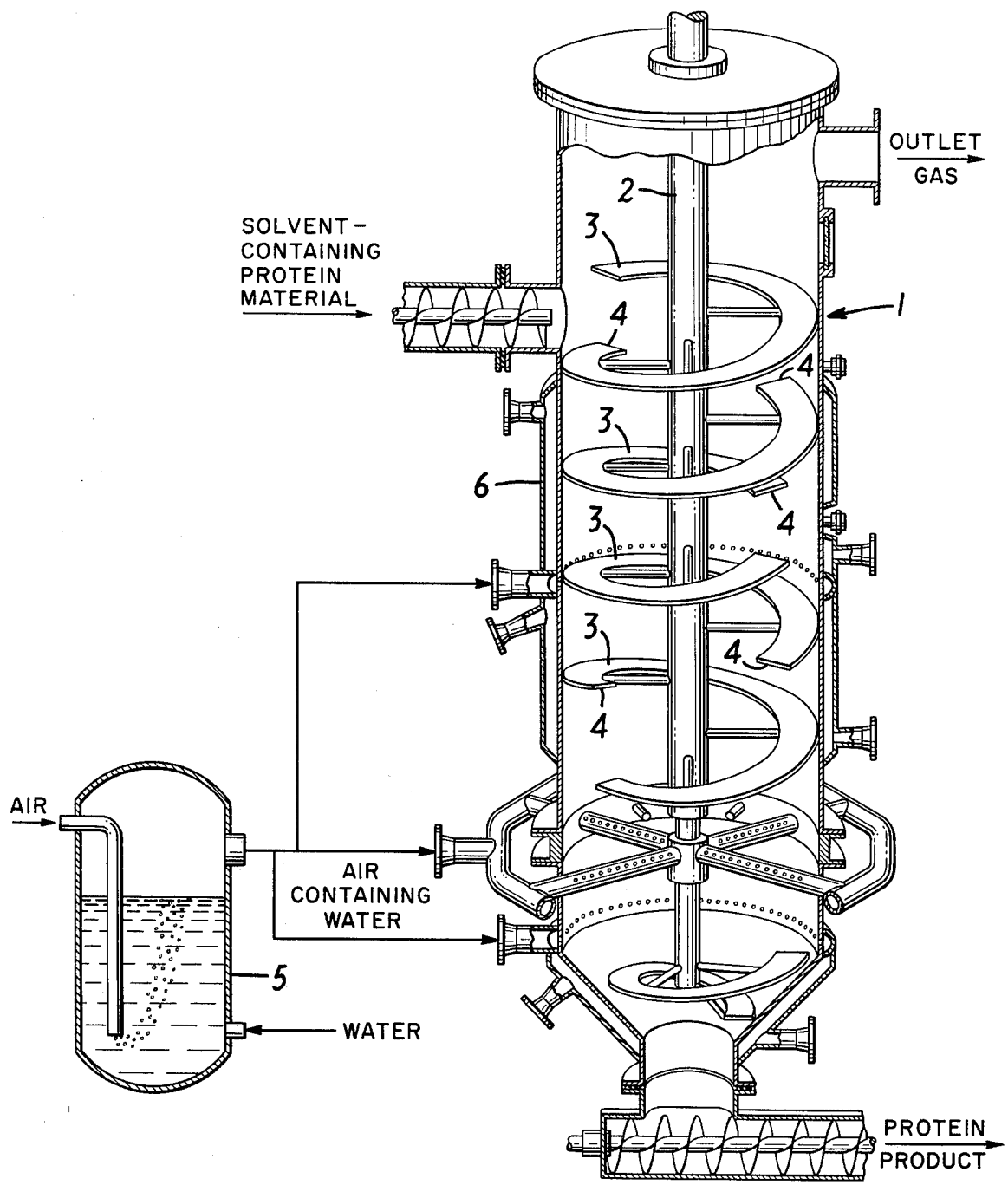

PROCESS FOR REMOVING SOLVENT FROM PROTEINACEOUS MATERIAL

This application is a continuation-in-part of our U.S. application Ser. No. 502,902, filed Sept. 3, 1974, now abandoned.

The present invention relates to a process for removing solvent from proteinaceous material.

The object of the present invention is to remove residual solvent from a protein material which has been extracted with a solvent or contains a solvent, possibly after a mechanical separation of excess solvent, so as to provide protein material having very low amounts of residual solvent without thereby heating the protein material so that a heat denaturation is caused and thereby loss of important functional properties of the protein material, such as coagulability, swellability, and water- and oil-binding capacity.

A further object of the present invention is to obtain coagulable and swellable, solvent-freed protein, such as animal protein from fish or vegetable protein from soya beans and rape.

Another object of the present invention is to provide a way to remove solvent from a protein material, even if it should have been heat denaturated by a prior treatment, without influencing too much the color of the end product.

It is previously known that one, by means of direct steam treatment and thereby a heating of the protein material to temperatures close to 100° C., can obtain an appreciable removal of the solvent. However, since the protein is thus subjected to heat influence above its denaturation point, the protein disadvantageously loses completely its functional properties, such as coagulability and water-binding capacity.

Protein material thus treated gives, after drying, a "sandy" feeling when it is eaten and makes it unsuitable, and in most cases unusable, as an additive to water-containing foodstuffs, such as fish and meat products.

The treatment of protein material with direct steam causes a color change which is disadvantageous when adding the protein material to light foodstuffs.

In the drawing, there is shown a vertical view, partly broken away, of an evaporator usable in the process of the present invention.

It has now surprisingly been possible by means of the present invention to eliminate these drawbacks at the same time as one obtains an appreciable evaporation of solvent. In accordance with the present invention, the protein material is treated or contacted with humidified air. The temperature and the relative humidity of the humidified air are such that enough energy is added for vaporization of the solvent at the same time as water is condensed from the humidified air and replaces the amount of solvent being vaporized.

According to an embodiment of the present invention, the treatment is carried out using humidified air, which humidified air has a temperature of from 40° C. to 90° C.

According to a preferred embodiment of the present invention, the treatment of nondenaturated protein is carried out using humidified air, which humidified air, has a temperature of from 40° C. to 70° C., more preferably from 45° C. to 65° C., and most preferably from 45° C. to 55° C.

According to another preferred embodiment of the present invention, the protein material is treated with humidified air in an amount of from 1.0 to 5.0 m$^3$ per kg of treated protein material, more preferably from 2.0 to 3.0 m$^3$ per kg of treated protein material.

According to a further preferred embodiment of the present invention, the humidified air is saturated to at least 50%, more preferably to at least 70%, and most preferably to 100%.

According to another further preferred embodiment of the present invention, the treatment of the protein material is carried out continuously in a vertical column by means of humidified air countercurrent to the flow of protein material, the column being indirectly heated to a temperature which is below the temperature of the humidified air introduced. Thus, the column is indirectly heated to a temperature which is preferably from 10° C. to 30° C., and more preferably from 10° C. to 15° C., below the temperature of the humidified air introduced. The humidified air may be distributed at some different levels in the column.

According to another further preferred embodiment of the present invention, the temperature of the humidified air containing water introduced in the upper part of the column exceeds the temperature of the humidified air introduced in the lower part of the column. The humidified air, which is introduced in the upper part of the column, is introduced in such an amount and at such a temperature that the temperature of the protein material in this part of the column of evaporation of solvent is substantially the same as the temperature of the protein material in the lower part of the column.

Protein material containing solvent is such protein material to which one has added solvent for preserving purposes or which contains solvent after an extraction. Solvents used for extraction are usually isopropanol, n-butanol, sec-butanol, isobutanol, ethanol, ethyl acetate, acetone, chlorinated hydrocarbons, and hexane. These solvents are used each severally or in combination.

The protein material can be of animal or vegetable origin, such as protein from slaughter offal, fish, crustaceans, or in water-living mammals, or protein from soya beans and rape, or protein from a cultivation of microorganisms on hydrocarbons.

Protein material which has been treated at a temperature exceeding the denaturation point of the protein, usually 60° C. to 70° C., will rapidly lose its functional properties, i.e., inter alia its capability to absorb and bind water. This property is very valuable and necessary when the addition of the protein as a substitute protein in products of animal origin, such as meat stuffing, sausages, and fish, is concerned in order to maintain the texture and the binding capacity of these foodstuffs. In using larger amounts of denaturated protein, no binding is obtained and the products will fall apart. Denaturated protein, moreover, has a sandy character, which leads to a coarse taste of the products in the mouth when eating them. When the functional properties are left in the protein, this sandy character does not exist and the products give a natural feeling when eating them.

The present invention will be described more in detail with reference to the drawing and the Examples below.

EXAMPLE 1

In a column or evaporator for evaporation of solvent, which column 1 is provided with a stirrer 2 in the shape of a helix 3 having interruptions 4 along its periphery and having a diameter of 100 mm. and a height of 200 mm., solvent-extracted fish material was introduced in an amount of 200 g. The composition of the protein material was 61.5% dry substance, 25.5% isopropanol and 13.0% water.

In the bottom of the evaporator 1, air containing water, i.e., humidified air, was introduced in an amount of 2.0 m³ per hour during efficient stirring.

The water saturated air was obtained by introducing air in the bottom of a closed vessel 5 containing water of a certain temperature, whereafter the air was introduced directly into the bottom of the evaporator 1.

The test was carried out using water saturated air of four different temperatures. The evaporation capacity is thereby directly dependent on the amount of energy added and is thereby controlled within a certain apparatus volume by the amount and temperature of the water saturated air. According to a table on the properties of moistened air, the heat contents of water saturated air calculated per kg air at 40° C. is 39.6 kcal/kg, while the energy contents of 50° C, 60° C., 70° C., 80° C., and 90° C. air is 65.3, 109, 190, 363 and 912 kcal/kg, respectively.

In the table below, the dry substance (DS) and remaining isopropanol (IPA) in the material is given after different period of time. The evaporator column 1, which was provided with a jacket, had a temperature which was 10° C. below that of the water saturated air.

TABLE I

| Time (min.) | Air 40° C. DS % | Air 40° C. IPA % | Air 50° C. DS % | Air 50° C. IPA % | Air 60° C. DS % | Air 60° C. IPA % | Air 70° C DS % | Air 70° C IPA % |
|---|---|---|---|---|---|---|---|---|
| 10 | 68.8 | 11.9 | 69.0 | 0.062 | 68.5 | 0.044 | 68.2 | 0.047 |
| 15 | 71.2 | 2.95 | 67.5 | 0.049 | 66.7 | 0.032 | 64.2 | 0.017 |
| 30 | 69.0 | 0.064 | 63.9 | 0.025 | 61.1 | 0.014 | 54.7 | 0.004 |
| 45 | 67.6 | 0.048 | 58.4 | 0.005 | 56.2 | 0.003 | | |
| 60 | 64.2 | 0.027 | 55.2 | 0.003 | 46.0 | 0.002 | | |

As is evident from the above results, an appreciable evaporation of solvent is very rapidly obtained, which after 60 min. or earlier has reached so far that only 20 to 270 ppm. are left in the moistened material. At the subsequent drying this residue is further reduced and is in dry material only 10 to 30 ppm. The evaporation can for this reason be interrupted already after 15 min. using 50° C., 60° C., and 70° C. air or after about 30 min. using 40° C. air, as the material then obtained contains 20 to 40 ppm. isopropanol after drying, which is extremely low. The drying is carried out at 35° C. by means of blowing with dry air.

15 min. blowing with water saturated air in accordance with above corresponds to an amount of air of 2.5 m³ per kg portein material.

EXAMPLE 2

A solvent evaporation in accordance with Example 1 was carried out on unground and ground products respectively, using water saturated air having a temperature of 50° C. The jacket temperature was 40° C. The unground product had a particle size according to the distribution: 18% <5-3 mm., 13% <3->2 mm. and 69% ≦2mm. The ground material had a particle size of ≦2 mm. The result is given in Table II below. The amount of protein material introduced was 400 g. containing 68.7% dry substance, 15.8% isopropanol and 15.5% water.

TABLE II

| Time (Min.) | Unground product DS % | Unground product IPA % | Ground Product DS % | Ground Product IPA % |
|---|---|---|---|---|
| 10 | 75.5 | 2.83 | 76.4 | 2.66 |
| 15 | 75.6 | 0.898 | 76.4 | 1.03 |
| 30 | 74.1 | 0.084 | 74.6 | 0.053 |
| 45 | 71.1 | 0.027 | 72.0 | 0.008 |
| 60 | 68.4 | 0.018 | 68.4 | 0.002 |

As is evident from the table, a satisfactory result is obtained also with the unground product, which shows that extracted fish material does not need to be further divided before evaporation. The differences shown in residual amounts of solvent are such that a further equality is obtained at the final drying of the material.

The products obtained according to Examples 1 and 2 had their functional properties left and showed good swellability in water except for the test with 70° C. air temperature, where a certain beginning coagulation was observed.

EXAMPLE 3

In a vertical column 1 provided with a stirrer 2 in the shape of a peripheral interrupted helix 3 and having a diameter of 300 mm., a solvent extracted fish protein was introduced to a height of 3200 mm. The stirrer 2 was rotated with a speed of 15 rpm. The column 1 which was provided with a jacket 6 had a temperature in the jacket 6 of 40° C.

The protein material introduced in the column consisted of herring, extracted with isopropanol, containing 55.6% dry substance, 38.2% isopropanol and 6.2% water. The temperature of the material when introduced was 20° C. The test was concerned about continuous evaporation with an amount of 18 kg/hour of protein material fed out. The height of material in the column was kept constant. The test was divided into two subsequent parts, namely (1), treatment with water saturated air obtained in accordance with Example 1 having a temperature of 55° C. and in an amount of 60 m³/hour introduced in the bottom of the column and (2) after 145 min., treatment using water saturated air having a temperature of 55° C. and in an amount of 30 m³/hour introduced in the bottom of the column and using water saturated air with a temperature of 80° C. and in an amount of 30 m³/hour introduced in the upper part of the column. The result is given in Table III below.

TABLE III

| Time (Min.) | DS % | IPA % |
|---|---|---|
| 45 | 62.7 | 22.2 |
| 65 | 62.2 | 21.4 |
| 105 | 61.7 | 18.6 |
| 145 | 64.9 | 15.6 |
| 155 | 63.4 | 12.83 |
| 175 | 65.7 | 9.28 |
| 195 | 67.2 | 4.64 |
| 205 | 67.0 | 1.91 |

As is evident from Table III, a better result is obtained in a continuous process if water saturated air is introduced also in the upper part of the material packing, whereby this air has a temperature which exceeds that introduced in the bottom of the evaporation column. However, the temperature of the protein material in the upper part did not exceed the temperature (55° C.) of the water saturated air in the lower part of the column in accordance with Table III-A below.

TABLE III-A

| Time (Min.) | Top of Column °C. | Upper Half of Column °C. | Middle of Column °C. | Lower Half of Column °C. | Bottom of Column °C. |
|---|---|---|---|---|---|
| 30 | 40 | 41 | 40 | 39 | 37 |
| 65 | 42 | 42 | 41 | 41 | 39 |
| 85 | 39 | 41 | 42 | 42 | 40 |
| 145 | 39 | 41 | 42 | 42 | 40 |
| 155 | 46 | 44 | 44 | 43 | 41 |
| 175 | 50 | 47 | 46 | 44 | 42 |
| 205 | 53 | 50 | 48 | 46 | 43 |
| 235 | 55 | 52 | 49 | 47 | 44 |
| 265 | 55 | 53 | 50 | 48 | 45 |

When the test was continued, the following results were obtained in accordance with Table III-B after further 15, 30, 45 and 60 minutes, respectively.

TABLE III-B

| Time (Min.) | DS % | IPA % |
|---|---|---|
| 15 | 66.2 | 0.5 |
| 30 | 65.8 | 0.2 |
| 45 | 65.4 | 0.06 |
| 60 | 65.0 | <0.025 |

The capacity of the column can thus be utilized completely by distributing the air containing water introduced on different levels in the column, whereby the air in the upper parts of the column can be given a temperature which is higher than that of the air introduced in the lower part. However, in treatment of non-denaturated protein the temperature should not exceed the denaturation point of the material. The temperature and the amount of air shall thus be selected so that the temperature of the protein material in the upper part does not exceed the temperature of the water saturated air in the lower part of the column. By distribution on different levels the energy added can be increased, which of course gives higher capacities.

EXAMPLE 4

The effect of the final drying on the residual amount of solvent in a material having been evaporated with water saturated air in accordance with the invention and in a directly dried material, which had not been evaporated, is given in Table IV below, in which different materials with different amounts of dry substance and isopropanol are given before and after drying after evaporation with water saturated air and a basic material which is not evaporated but directly dried. The drying was carried out at 35° C. using sweeping air.

TABLE IV

| After Evaporation | | | After Final Drying | | |
|---|---|---|---|---|---|
| DS % | IPA % | H₂O % | DS % | IPA % | H₂O % |
| 65.1 | 3.91 | 31.0 | 93.8 | 0.233 | 5.97 |
| 65.8 | 1.91 | 32.3 | 93.6 | 0.083 | 6.32 |
| 65.6 | 1.25 | 33.1 | 93.6 | 0.053 | 6.35 |
| 65.6 | 0.98 | 33.4 | 93.4 | 0.040 | 6.56 |
| Before Drying | | | After Drying | | |
| 55.6 | 38.2 | 6.2 | 92.0 | 6.86 | 1.14 |

As is evident from Table IV, an extremely improved result is obtained at the final drying, if the material has been evaporated first using water saturated air.

EXAMPLE 5

The importance of the water in the evaporation air is evident from the test below, wherein 200 g. of test material with 65.1% of dry substance, 25.8% of isopropanol and 9.1% of water was treated, on one hand, with water saturated air and, on the other hand, with nonwater saturated air (max 35% relative humidity) in an amount of 2 m³/hour during 45 min. and having an evaporation temperature of the air of 30° C., 40° C., 50° C. and 60° C. The jacket temperature was in each test kept 10° C. below the temperature of the air containing water. The result after 45 min. is given in Table V below.

TABLE V

| Type of Air | Evaporation Temperature °C. | DS % | IPA % | H₂O |
|---|---|---|---|---|
| Water Saturated Air | 30 | 80.4 | 0.91 | 18.7 |
| | 40 | 78.0 | 0.21 | 21.8 |
| | 50 | 76.4 | 0.053 | 23.5 |
| | 60 | 74.5 | 0.036 | 25.5 |
| Nonwater Saturated Air | 30 | 87.7 | 5.06 | 7.2 |
| | 40 | 90.7 | 5.10 | 4.2 |
| | 50 | 93.9 | 6.09 | ± 0 |
| | 60 | 94.2 | 6.44 | ± 0 |

The results show a remarkable difference between the two different evaporation methods, whereby the second method must be regarded more or less as drying method.

EXAMPLE 6

A series of tests were carried out in order to show the validity of the process for different solvents and protein materials. In Table VI-A, an evaporation test on presscake flour from sardinella extracted with isopropanol is given having 65.1% dry substance, 25.8% isopropanol and 9.1% water. 350 g. of test material were treated with water saturated air having inlet temperature of 50° C. and in an amount of 2 m³/hour in a column provided with a jacket, the jacket temperature being 40° C.

TABLE VI-A

| Evaporation Time Min. | Outlet Gas Temperature °C. | DS % | IPA % | H₂O % |
|---|---|---|---|---|
| 2.5 | 32 | 64.1 | 24.4 | 9.5 |
| 5 | 35 | 68.3 | 19.1 | 12.6 |
| 10 | 36 | 71.8 | 7.6 | 20.6 |
| 15 | 39 | 73.7 | 1.81 | 24.5 |
| 20 | 42 | 72.0 | 0.389 | 27.6 |
| 25 | 43 | 70.8 | 0.162 | 29.0 |
| 30 | 44 | 69.0 | 0.082 | 30.9 |
| 45 | 44 | 64.0 | 0.030 | 36.0 |
| 60 | 44 | 57.8 | 0.013 | 42.2 |

The same test using presscake flour extracted with sec-butanol (SBA) was carried out, the extracted material containing 56.8% dry substance, 18.7% sec-butanol and 24.5% water. The result is given in Table VI-B below.

TABLE VI-B

| Evaporation Time Min. | Outlet Gas Temperature °C. | DS % | SBA % | H₂O % |
|---|---|---|---|---|
| 2.5 | 35 | 56.9 | 18.2 | 24.9 |
| 5 | 38 | 58.1 | 14.5 | 27.4 |
| 10 | 39 | 60.6 | 6.56 | 32.8 |
| 15 | 40 | 60.7 | 1.81 | 37.5 |
| 20 | 41 | 60.4 | 0.77 | 38.8 |
| 25 | 44 | 59.2 | 0.24 | 40.6 |
| 30 | 44 | 57.3 | 0.075 | 42.6 |
| 45 | 44 | 52.3 | 0.022 | 47.7 |
| 60 | 44 | 47.1 | 0.007 | 52.9 |

The same test was carried out on presscake flour extracted with hexane, the extracted material containing 70.4% dry substance, 21.5% hexane and 8.1% water. The result is given in Table VI-C below.

TABLE VI-C

| Evaporation Time Min. | Outlet Gas Temperature °C. | DS % | Hexane % | H₂O % |
|---|---|---|---|---|
| 2.5 | 23 | 80.4 | 10.7 | 8.9 |
| 5 | 24 | 88.1 | 0.85 | 11.0 |
| 10 | 41 | 84.8 | 0.095 | 15.1 |
| 15 | 43 | 83.0 | 0.060 | 16.9 |
| 20 | 44 | 81.4 | 0.025 | 18.6 |
| 25 | 44 | 79.1 | 0.021 | 20.9 |
| 30 | 44 | 77.7 | 0.015 | 22.3 |
| 45 | 44 | 72.8 | 0.013 | 27.2 |
| 60 | 44 | 67.4 | 0.010 | 32.6 |

The same test was carried out on soya beans extracted with hexane, the extracted material containing 79.5% dry substance, 11.4% hexane, and 9.1% water. The result is given in Table VI-D below.

TABLE VI-D

| Evaporation Time Min. | Outlet Gas Temperature °C. | DS % | Hexane % | H₂O % |
|---|---|---|---|---|
| 2.5 | 28 | 88.6 | 0.515 | 10.9 |
| 5 | 32 | 87.0 | 0.178 | 12.8 |
| 10 | 40 | 85.3 | 0.120 | 14.6 |
| 15 | 42 | 83.8 | 0.095 | 16.1 |
| 20 | 43 | 82.2 | 0.075 | 17.7 |
| 25 | 44 | 80.3 | 0.050 | 19.6 |
| 30 | 44 | 78.5 | 0.030 | 21.5 |
| 45 | 44 | 71.6 | 0.018 | 28.4 |
| 60 | 44 | 64.5 | 0.011 | 35.5 |

The results show that the choice of solvent or the choice of protein material has no influence on the evaporation effect, but a satisfactory result is obtained with different types of solvent and protein material.

EXAMPLE 7

A test was carried out in order to show the effect of the amount of water present in the air containing water. Thereby evaporation of isopropanol was carried out in accordance with that in Table VI-A given with that difference that the air being 50° C. and saturated to 100% was heated to 60° C. before introduction into the evaporation column, whereby the degree of saturation was decreased to 57%. The result of the evaporation is evident from Table VII below.

TABLE VII

| Evaporation Time Min. | Outlet Gas Temperature °C. | DS % | IPA % | H₂O % |
|---|---|---|---|---|
| 2.5 | 35 | 65.1 | 22.1 | 12.8 |
| 5 | 37 | 67.7 | 16.3 | 16.0 |
| 10 | 40 | 73.0 | 3.60 | 23.4 |
| 15 | 44 | 73.1 | 0.471 | 26.4 |
| 20 | 45 | 72.6 | 0.153 | 27.2 |
| 25 | 45 | 71.3 | 0.097 | 28.6 |

TABLE VII-continued

| Evaporation Time Min. | Outlet Gas Temperature °C. | DS % | IPA % | H₂O % |
|---|---|---|---|---|
| 30 | 45 | 69.8 | 0.049 | 30.2 |
| 45 | 45 | 67.1 | 0.031 | 32.9 |
| 60 | 45 | 63.3 | 0.016 | 36.7 |

As the outlet gas temperature has increased just 1° C. (cf Table VI-A above) compared with evaporation using water saturated air at 50° C., this indicates that the excess heat in the nonwater saturated air is consumed during the passage through the material packing. This is also shown by a somewhat more rapid evaporation of residual isopropanol in the beginning of the evaporation course and a somewhat lower condensation of water in the product. The requirement for an efficient evaporation is that enough energy is added to evaporate the solvent at the same time as a certain amount of water has to condense in the protein material in exchange with the solvent evaporated. If these requirements are fulfilled, the low temperature evaporation can be carried out within wide limits for the relative humidity of the air, but it is evident that one having a maximal upper temperature limit has highest evaporation capacity with 100% relative humidity, i.e., water saturated air.

The materials evaporated according to the present invention, which materials have been treated before this treatment so that they are not denaturated, have their functional properties left after evaporation, such as water swellability.

What is claimed is:

1. A process for evaporation of solvent from solvent-containing proteinaceous material which comprises continuously treating the protein material in a vertical column with countercurrently flowing humidified air in an amount of from 1.0 to 5.0 m³ per kg. of treated protein material, the column being indirectly heated to a temperature below the temperature of the humidified air introduced and the humidified air having a temperature of from 40° C. to 90° C. and and a relative humidity of at least 50% such that enough energy is added for vaporization of the solvent at the same time as water is condensed from the humidified air and replaces the amount of solvent being vaporized.

2. The process according to claim 1 wherein non-denaturated protein material to provide protein material having very low amounts of residual solvent without denaturing protein by heating is treated with humidified air having a temperature of from 40° C. to 70° C.

3. The process according to claim 2 wherein the humidified air has a temperature of from 45° C. to 65° C.

4. The process according to claim 3 wherein the humidified air has a temperature of from 45° C. to 55° C.

5. The process according to claim 1 wherein the protein material is treated with humidified air in an amount of from 2.0 to 3.0 m³ per kg. of treated protein material.

6. The process according to claim 1 wherein the humidified air is water-saturated to at least 70%.

7. The process according to claim 6 wherein the humidified air is water-saturated to 100%.

8. The process according to claim 1 wherein the column is indirectly heated to a temperature which is from 10° C. to 30° C. below the temperature of the humidified air introduced.

9. The process according to claim 8 wherein the column is indirectly heated to a temperature which is from 10° C. to 15° C. below the temperature of the humidified air introduced.

10. The process according to claim 1 wherein the humidified air is introduced at some different levels in the column.

11. The process according to claim 10 wherein the temperature of the humidified air introduced in the upper part of the column exceeds the temperature of humidified air introduced in the lower part of the column.

12. The process according to claim 11 wherein the humidified air, which is introduced in the upper part of the column, is introduced in such an amount and at such a temperature that the temperature of the protein material in this part of the column by means of vaporization of solvent is substantially the same as the temperature of the protein material in the lower part of the column.

13. A nondenaturated, low residual solvent protein product with retained functional properties obtained by a process in which solvent-containing proteinaceous material is treated with humidified air in an amount of from 1.0 to 5.0 $m^3$ per kg of treated protein material while heated indirectly to a temperature below the temperature of the humidified air, the humidified air having a temperature of from 40° C. to 70° C. and a relative humidity of at least 50%.

* * * * *